W. A. JOHNSON.
FRUIT PICKER.
APPLICATION FILED MAY 12, 1909.
964,108.
Patented July 12, 1910.
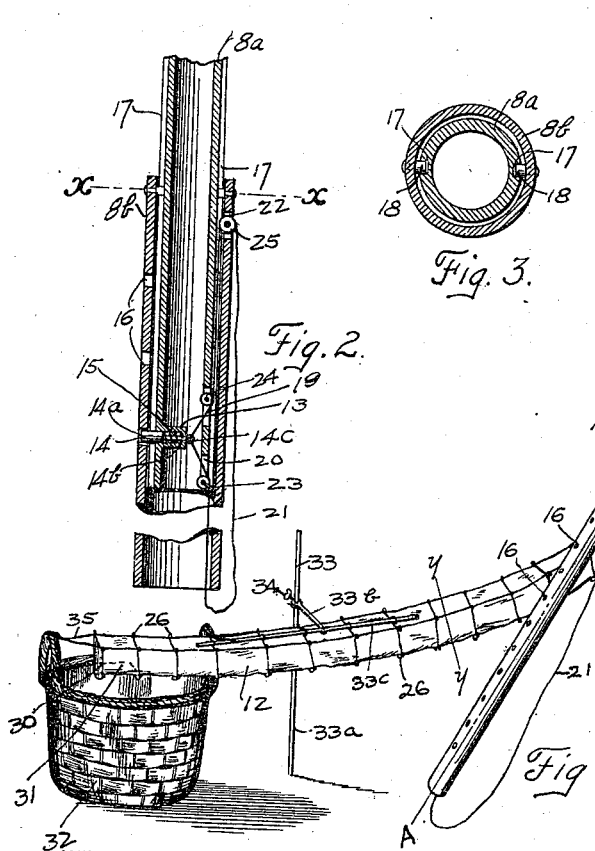

UNITED STATES PATENT OFFICE.

WILLIAM A. JOHNSON, OF BUFFALO, NEW YORK.

FRUIT-PICKER.

964,108.     Specification of Letters Patent.     Patented July 12, 1910.

Application filed May 12, 1909. Serial No. 495,514.

*To all whom it may concern:*

Be it known that I, WILLIAM A. JOHNSON, a citizen of the United States, and a resident of Buffalo, county of Erie, and State of New York, have invented certain new and useful Improvements in Fruit-Pickers, of which the following is a full, clear, and exact description.

This invention relates to improved means for detaching fruit from trees and means for conveying the same without injury to some suitable stationary receptacle.

The object of my invention has been to provide means adapted to conveniently detach fruit from trees without injury thereto and to provide a cushioned conveying means for conducting the fruit thus detached to a suitable receptacle and then allowing it, after being cushioned in its descent to fall gently into some suitable receptacle placed under the outlet of such conveying means.

The other objects of this invention which relate more particularly to its specific construction and the special arrangement of its various parts will be understood by those acquainted with the art from the following description and the accompanying drawings in which like characters of reference indicate like parts throughout the several views and in which:

Figure 1 is an elevation of my fruit picker. Fig. 2 is a sectional detail taken on the line A—A of Fig. 1. Fig. 3 is a section taken on the line X—X of Fig. 2. Fig. 4 is a section taken on the line Z—Z of Fig. 1. Fig. 5 is a section taken on the line Y—Y of Fig. 1.

In the drawings 6 represents the fruit picker proper which is preferably metallic. One end of the fruit picker 6 is suitably secured at 7 to the extensible staff 8. The center of the fruit picker 6 is provided with an opening or slot 9 and at the end opposite the staff flanges 10 extend inwardly toward the slot 9 forming between them a notch 11. To the fruit picker 6 is suitably secured one end of the conveyer 12.

The staff 8 is composed of two parts $8^a$ and $8^b$ which telescope with each other as clearly shown in Fig. 1. Near the lower end of the staff part $8^a$ I provide a pin socket 13 within which a pin 14 is adapted to travel backwardly and forwardly. The pin 14 is composed of the enlarged end $14^a$ and a spindle $14^b$. On the end of the spindle $14^b$ is provided an eye $14^c$. A spring 15 is adapted to rest within the pin socket 13 so that one end rests against the inner end of the pin socket and the other end rests against the shoulder on the enlarged end $14^a$ of the pin 14. The normal tendency of this spring 15 is to force the pin 14 away from the inner end of the pin socket 13. The staff part $8^b$ is provided at suitable intervals with perforations 16 into which the pin 14 is adapted to pass.

The staff part $8^a$ is preferably provided with grooves 17. At the upper end of the staff part $8^b$ I provide pins or lugs 18 which extend inwardly from the staff part $8^b$ and are adapted to always travel in the grooves 17 of the staff part $8^a$. By this means the staff parts $8^a$ and $8^b$ are so interlocked that when revolved they will always revolve together.

Near the lower end of the staff part $8^a$ and on the side wall opposite the pin socket 13 I provide slots 19 and 20 through which a rope or some similar article 21 may pass. Near the upper end of the staff part $8^b$ and on the side adjacent the slots 19 and 20 of the staff part $8^a$ I provide a slot 22 through which the rope 21 may pass.

One end of the rope 21 is secured to the eye $14^c$ and passes thence through the slot 19, grooves 17, slot 22 and along the outside of the staff part $8^b$ thence through the inside of said staff part $8^b$ and through the slot 20 back to the eye $14^c$ where the other end is suitably secured. In order to lessen the friction of the rope 21 I preferably provide in the slot 20 a roller 23 and in the slot 19 a roller 24. Similarly I likewise provide in the slot 22 a roller 25. The rope 21 is adapted to pass over these several rollers 23, 24 and 25.

The conveyer 12 is preferably made of some textile fabric of any suitable diameter. In order to maintain the conveyer 12 in a proper expanded condition I provide at suitable intervals wire frames 26. These wire frames 26 are preferably provided with eyelets 27 to which the conveyer 12 may be suitably secured and thus the conveyer is maintained in an expanded shape. Preferably the conveyer 12 is secured to the staff part $8^a$ or any part of the length of such staff part as clearly shown in Fig. 1. I provide a wire frame 28 of similar construction to the wire frame 26 for thus securing the conveyer 12 to the staff part 8ᵃ. This wire frame 28 is provided with eyelets 27 like the eyelets 27 of the wire frame 26 and in addition thereto a loop 29 is formed therein for passing around the staff part 8ᵃ.

The exit end of the conveyer 12 is provided with a flap 30 between which and the next wire frame 26 an outlet opening 31 from which the picked fruit may pass into a receptacle 32 is provided (see Fig. 1).

It will be evident that the length of the conveyer 12 may be as great as desired. Preferably I provide a supporting means 33 which is adapted to hold that part of the conveyer 12 which is between the staff 8 and the receptacle 32 at any desired height. This supporting means is composed of a standard 33ᵃ, and arm 33ᵇ and a cross piece 33ᶜ. The arm 33ᵇ passes around the standard 33ᵃ and is locked in any desired position thereto by the thumb-screw 34. The arm 33ᵇ carries the cross piece 33ᶜ and this cross piece is adapted to pass through two or more of the wire frames 26. The exit end of the conveyer 12 may be placed upon or secured to the receptacle 32 in any desired way. In Fig. 1 I have shown this exit end secured to the receptacle 32 by wires or twine 35.

Having thus described the several parts of my invention I will now describe the method of operating it. The operator first places the receptacle 32 in the desired position and secures to it the exit end of the conveyer 12. The supporting means 33 are then placed near the receptacle 32 and the arm 33ᵇ is adjusted so that it will hold the cross piece 33ᶜ and the part of the conveyer 12 to which that is connected at the desired distance above the ground. The operator then grasps the staff part 8ᵇ and then adjusts the length of the staff 8 so that it will reach the desired place in the tree from which the fruit is to be picked.

In order to increase the length of the staff 8 the operator grasps that part of the rope 21 which passes on the outside of the staff part 8ᵇ and pulls downwardly thereon. This creates a tension on that part of the string 21 between the operator's hand and the eye 14ᶜ which part passes over the anti-friction rollers 24 and 25. Such tension will draw the pin 14 from engagement with one of the perforations 16. This disengages the staff part 8ᵃ from the staff part 8ᵇ and a further pull on the rope 21 draws upwardly the staff part 8ᵃ away from the staff part 8ᵇ and thus increases the length of the staff 8. When the staff has been made sufficiently long the tension on the rope 21 is withdrawn so that pin 14 will be directed into one of the perforations 16 because of the tension of the spring 15. The operator then grasps the lower end of the staff part 8ᵇ and directs the fruit picker 6 so that the fruit will pass through the slot 9. The fruit picker 6 is then drawn toward the operator so that the fruit is below the flanges 10 and the stem passes through the notch 11. A slight downward pull by the operator will then disengage the fruit from its stem and the fruit will travel downwardly through the conveyer 12 until it strikes the end flap 30 when it will gently fall through the outlet 31 into the receptacle 32. If desired of course the edges of the flanges 10 around the notch 11 may be sharpened so that the stem of the fruit may be more readily detached from the fruit tree.

Should the operator desire to shorten the length of the staff 8 he grasps that part of the rope 21 which passes on the outside of the staff part 8ᵇ and pulls upwardly upon it. This creates a tension on that part of the string 21 between the operator's hand and the eye 14ᶜ which part passes over the anti-friction rollers 23. Such tension will draw the pin 14 from the perforations 16 and thus allow the staff part 8ᵃ to fall downwardly within the staff part 8ᵇ. If the staff part 8ᵃ does not readily move downwardly within the staff part 8ᵇ a slight upward tension placed upon the rope 21 will draw it downwardly. When the staff 8 has been sufficiently shortened the tension on the rope 21 is relieved and the pin 14 will then pass within one of the perforations 16 and thus lock the staff parts 8ᵃ and 8ᵇ in secure engagement with each other.

It will be clear that the staff part 8ᵃ cannot revolve within the staff part 8ᵇ because it is locked from rotation therein by reason of the lugs or pins 18 secured to the staff part 8ᵇ engaging with the slots 17 on the staff part 8ᵃ.

In the construction herein shown and described I have embodied my invention in its preferable form. I do not, however, desire to be limited to such construction since other means having similar capabilities may be used without departing from the spirit of my invention.

Having thus described my invention what I claim is:

1. A device of the character described comprising a fruit picker formed with a slot through which the fruit may pass, flanges extending inwardly toward said slot and so related that a notch is formed between said flanges, a conveyer secured to said fruit picker and a staff secured to said fruit picker comprising two telescoping parts, interengaging means between said telescoping parts for preventing the rotation of one independently of the other and means for interlocking said telescoping parts whenever desired whereby said staff may be lengthened or shortened as desired.

2. A device of the character described comprising a fruit picker, a staff secured to said fruit picker comprising two telescoping parts, inter-engaging means between said telescoping parts for preventing their relative rotation, means for interlocking said telescoping parts whenever desired, a conveyer tube of flexible material secured to said fruit picker, means for preventing the collapse of said tube and an end flap secured to the end of said tube in such a position that the fruit will be cushioned in its fall into its receiving receptacle.

3. In a device of the character described, the combination with a fruit picker, of a conveyer secured to said fruit picker, comprising a tube of flexible material, means for preventing the collapse of said tube, an end flap secured to the end of said tube in such a position that the fruit will be cushioned in its fall into its receiving receptacle, and a staff comprising two telescoping parts, interengaging means between said telescoping parts for preventing the rotation of one independently of the other and means for interlocking said telescoping parts whenever desired whereby said staff may be lengthened or shortened as desired.

4. In a device of the character described the combination with a fruit picker, of a conveyer secured to said fruit picker, comprising a tube of flexible material, means for preventing the collapse of said tube, an end flap secured to the end of said tube in such a position that the fruit will be cushioned in its fall into its receiving receptacle, a staff comprising two telescoping parts and interengaging means between said telescoping parts for preventing the rotation of the one independently of the other.

5. In a device of the character described, the combination with a fruit picker, of a conveyer secured to said fruit picker, comprising a tube of flexible material, means for preventing the collapse of said tube, an end flap secured to the end of said tube in such a position that the fruit will be cushioned in its fall into its receiving receptacle, a staff comprising two telescoping parts, interengaging means between said telescoping parts for preventing the rotation of one independently of the other, means for interlocking said telescoping parts whenever desired whereby said staff may be lengthened or shortened as desired, and means for securing said conveyer to said staff.

6. A device of the character described comprising a fruit picker, a conveyer secured to said fruit picker, a staff secured to said fruit picker and means for altering the length of said staff comprising two telescoping parts, inter-engaging means between said parts for preventing their relative rotation with each other, a pin carried by the inner telescoping part, a spring for normally holding said pin in engagement with the outer telescoping part and means secured to said pin for throwing it out of engagement with said outer telescoping part.

7. In a device of the character described the combination with a fruit picker and a conveyer secured to said fruit picker of an extensible staff secured to said fruit picker and comprising two telescoping parts, interlocking means between said telescoping parts for preventing the rotation of one independently of the other, a pin carried by the inner telescoping part, a spring whose normal tendency is to hold said pin in engagement with the outer telescoping part, recesses in said outer telescoping part for receiving said pin, and means for pulling said pin out of engagement with said outer telescoping part and at the same time for drawing the inner telescoping part out of the outer telescoping part or drawing it within said outer telescoping part.

8. In a device of the character described the combination with a fruit picker, of a conveyer secured to said fruit picker comprising a tube of flexible material, means for preventing the collapse of said tube, an end flap secured to the end of said tube in such a position that the fruit will be cushioned in its fall into its receiving receptacle, and a staff secured to said fruit picker comprising two telescoping parts, a pin carried by the inner telescoping part, a spring for normally holding said pin in engagement with the outer telescoping part and means secured to said pin for throwing it out of engagement with the outer telescoping part.

9. In a device of the character described the combination with a fruit picker of a conveyer secured to said fruit picker comprising a tube of flexible material, means for preventing the collapse of said tube, an end flap secured to the end of said tube in such a position that the fruit will be cushioned in its fall into its receiving receptacle, and a staff secured to said fruit picker comprising two telescoping parts, inter-engaging means between said telescoping parts for preventing their relative rotation, a pin carried by the inner telescoping part, a spring for normally holding said pin in engagement with the outer telescoping part, and means secured to said pin for throwing it out of engagement with the outer telescoping part.

10. A device of the character described comprising a fruit picker, a conveyer secured to said fruit picker comprising a tube of flexible material, means for preventing the collapse of said tube, a staff comprising two telescoping parts, interengaging means between said telescoping parts for preventing the rotation of one independently of the other, means for securing said tube to said staff for a part of the length of said tube and means for holding the free end of said tube at any desired distance from the ground comprising a standard and a vertically adjustable arm which is adapted to engage with the said means for preventing the collapse of said tube.

In testimony whereof, I have hereunto set my hand in the presence of two witnesses.

WILLIAM A. JOHNSON.

Witnesses:
J. WM. ELLIS,
ETHEL A. KELLY.